Oct. 4, 1955  R. H. DYKEHOUSE  2,719,326
PLASTIC MOLDING MACHINES
Filed Feb. 28, 1950  4 Sheets-Sheet 1

Inventor
Robert H. Dykehouse
by Parker & Carter
Attorneys.

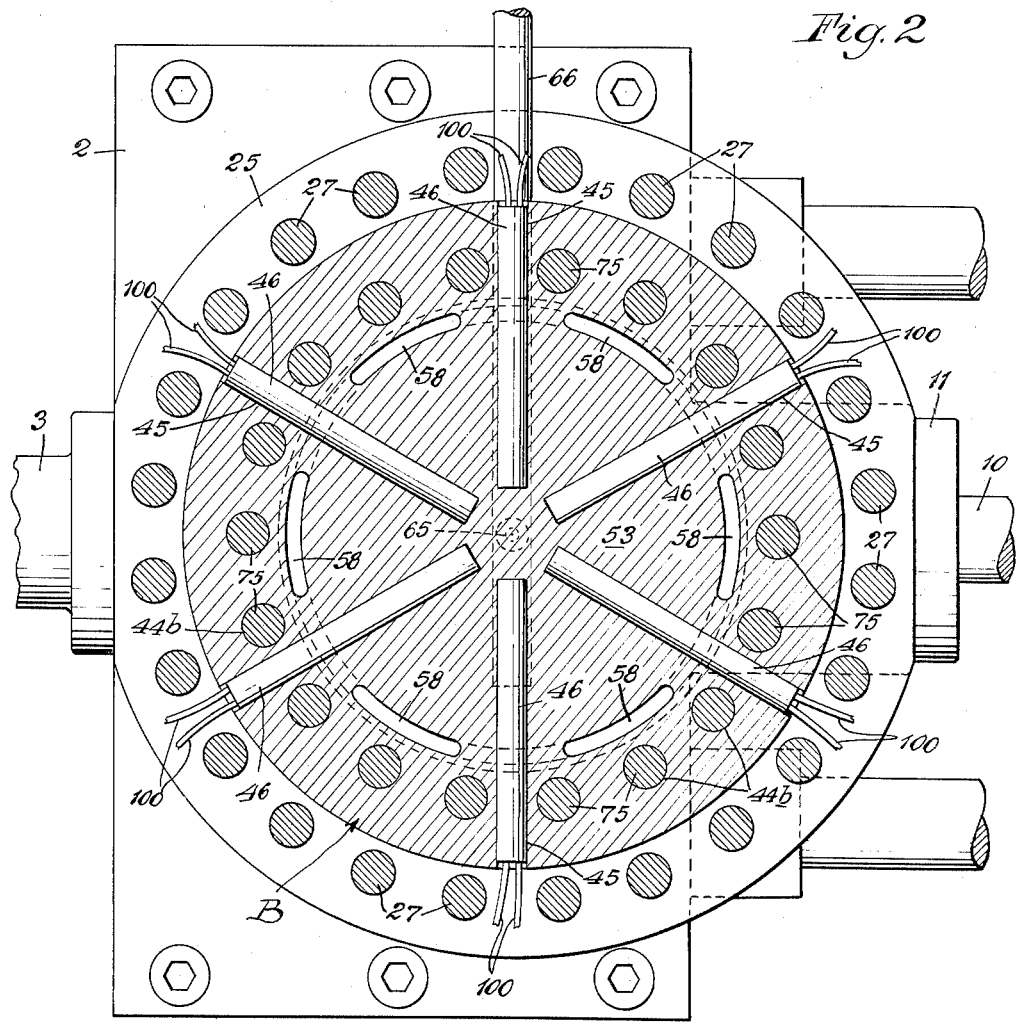

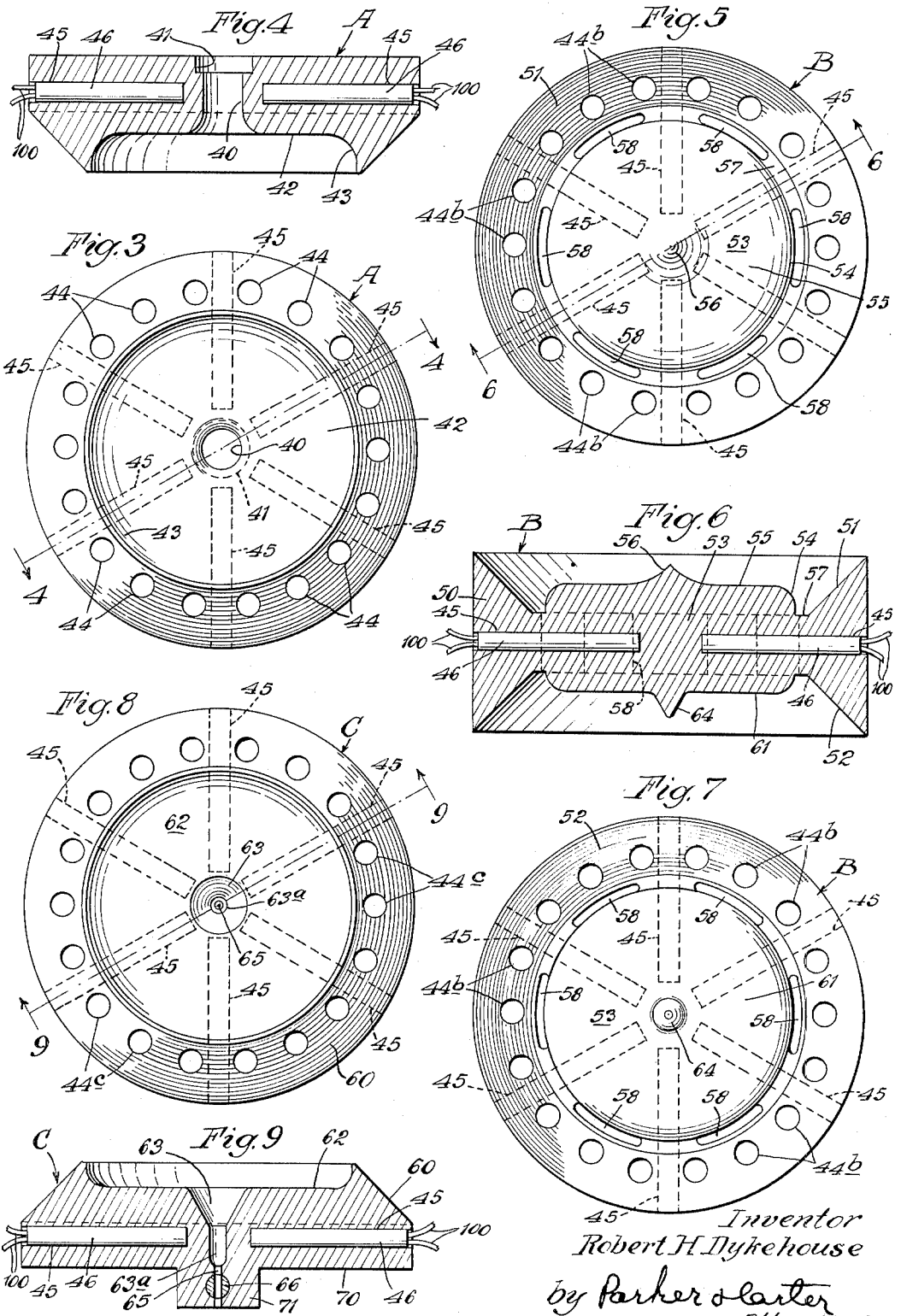

Oct. 4, 1955   R. H. DYKEHOUSE   2,719,326
PLASTIC MOLDING MACHINES
Filed Feb. 28, 1950   4 Sheets-Sheet 4
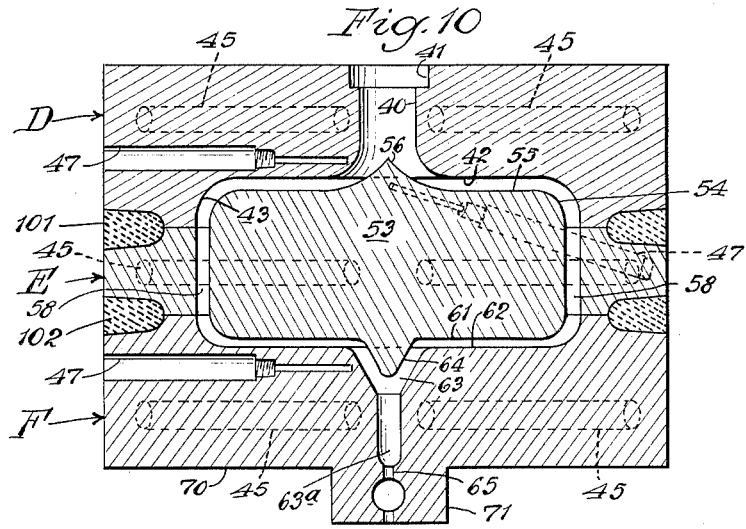
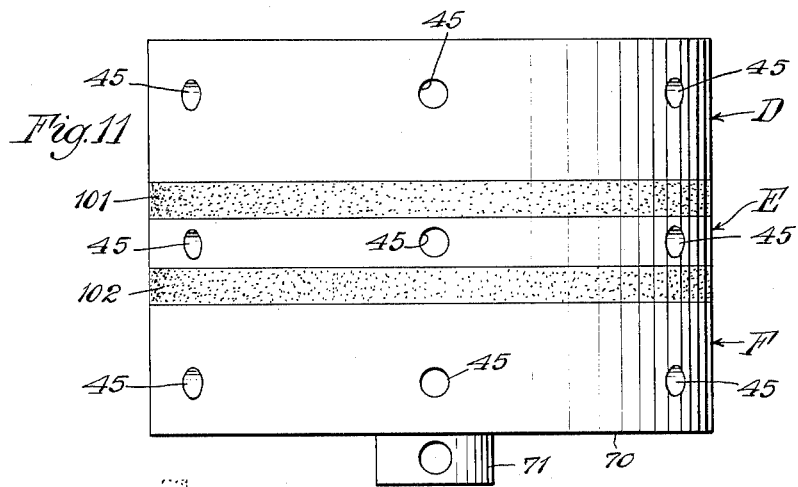
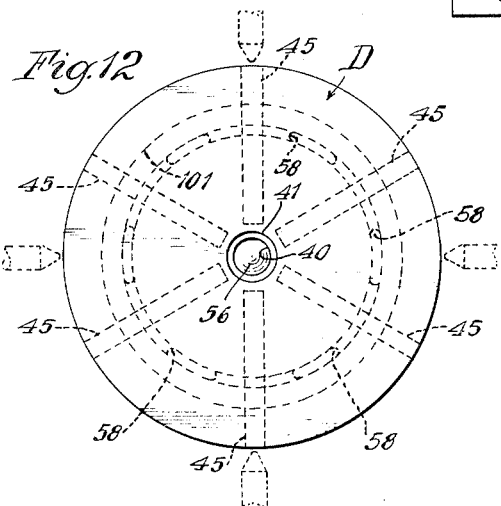
Inventor
Robert H. Dykehouse
by Parker & Carter
Attorneys

United States Patent Office 2,719,326
Patented Oct. 4, 1955

2,719,326

PLASTIC MOLDING MACHINES

Robert H. Dykehouse, Los Angeles, Calif., assignor to Crown Machine and Tool Company, Inc., Fort Worth, Tex., a corporation of Texas Application February 28, 1950, Serial No. 146,879

3 Claims. (Cl. 18—30)

This invention relates to improvements in plastic molding machines, and has for one purpose to provide an improved pre-plasticizing unit.

Another purpose is to provide a pre-plasticizing chamber assembly in which plasticizable solids may be quickly and efficiently plasticized under relatively low pressures.

Another purpose is to provide an improved association between a pre-plasticizing unit and an injector unit, whereby pre-plasticized material may more efficiently be fed into the mold.

Another purpose is to provide improved means for heating the pre-plasticizing chamber.

Another purpose is to provide a pre-plasticizing unit which is efficiently and easily assembled and disassembled in molding machines.

Another purpose is to provide such a unit with readily removable and insertable heating elements.

Another purpose is to provide an improved valving assembly for a pre-plasticizing unit and its associated injection unit.

Other purposes will appear from time to time in the course of the specification and claims.

The invention is illustrated more or less diagrammatically in the accompanying drawings wherein:

Figure 2 is a section, on an enlarged scale, on the line 2—2 of Figure 1;

Figure 3 is a bottom view of one element of the pre-injection unit shown in Figure 1;

Figure 4 is a section on the line 4—4 of Figure 3;

Figure 5 is a top view of another element of the unit;

Figure 6 is a section on the line 6—6 of Figure 5;

Figure 7 is a bottom view of the element shown in Figure 6;

Figure 8 is a top plan view of the lower member of the pre-injection unit;

Figure 9 is a section on the line 9—9 of Figure 8;

Figure 10 is a vertical section through another form of the device;

Figure 11 is a side elevation of the structure shown in Figure 10; and

Figure 12 is a diagrammatic illustration of a method of welding the unit of Figures 10 and 11.

Like parts are indicated by like symbols throughout the specification and drawings.

Figure 1:
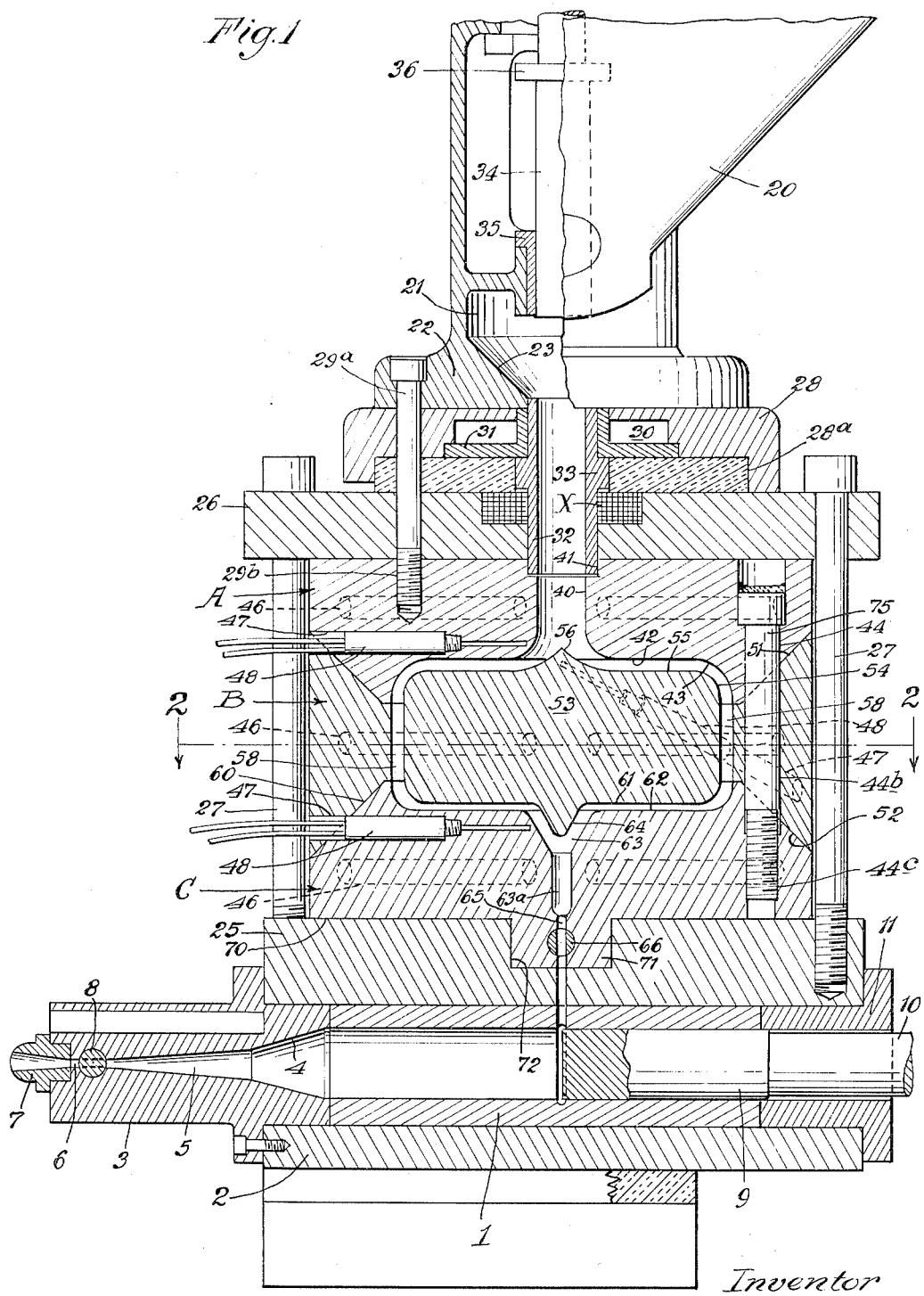
Figure 1 is a vertical section, with parts in side elevation.

Referring to the drawings, 1 generally indicates the injection cylinder of a plastic molding machine. It is shown as enclosed in any suitable support or block 2. 3 is a nozzle portion shown as having an initially tapered bore 4, a further and somewhat more gradually tapered bore 5, and a discharge bore 6 leading to and communicating with any suitable discharge nozzle 7. The nozzle 7 is shown as an insert in the end of the block 3.

The actual outflow of plasticized material is controlled by any suitable valve 8 which may, for example, be of an axially sliding type, although, of course, any suitable type of valve may be employed. 9 indicates any suitable piston, shown as mounted on a piston rod 10, passing through any suitable stuffing box or the like, indicated at 11. It will be understood that any suitable means, not herein shown, may be employed for moving the piston 9 toward and away from the nozzle end of the cylinder 1.

20 indicates any suitable storage or feed hopper in which plastic materials, including thermoplastics, may be stored or fed. Such materials may be furnished in separate particles of granular or other size.

In the use of my pre-plasticizing unit the plastic materials, initially suitably divided, are fed downwardly through the hopper 20, through the neck 21, and into the hopper-shaped surface 23 of the hopper base or support 22. Any suitable means, not herein shown in detail, may be employed for feeding or agitating the plasticizable solids. It will be understood that the solids are pre-plasticized in the course of their movement beyond the hopper-like surface 23 to the cylinder 1. For example, I illustrate a unit including a bottom plate 25 which may be secured to or form part of the member 2. A top plate 26 is secured to it by any suitable screws or other connections 27. Between the two, I illustrate a pre-plasticizing unit having the elements generally indicated as A, B and C, which will later be described in detail.

Above the top plate I illustrate an insulating member or shell 28 within which is a layer or body of insulating material 29. The hopper base 22 is shown as firmly secured in relation to the top plate 26 by screws 29a which may extend through the shell 28 and insulation 29, and which hold the parts firmly together. It will be noted that the insulating layer 29 is received within a recess 28a in the shell 28. A further recess may form a passage 30 for any suitable coolant, the passage being completed by the flanged ring 31.

The ring 31 and the insulation 29 surround the tubular passage 32. This passage element is shown as outwardly flanged as at 33. Its inner bore constitutes a passage for the reception of the plasticizable solids. Its cylindrical interior is formed and adapted to receive a reciprocating feed piston 34 guided in any suitable guide or guides 35, and provided with any suitable limit stop or enlargement 36. The details of the mechanism for reciprocating the piston 34 need not be shown, but it will be understood that any suitable means may be employed for reciprocating the piston 34 into and out of the bore of the tube or cylinder 32, whereby plasticizable solids fed by or through the hopper 20 may be positively fed or forced downwardly through the cylinder 32 and into the pre-plasticizing unit below described.

Referring to the pre-plasticizing unit proper, its upper member is shown in Figures 3 and 4, its intermediate member B is shown in Figures 5, 6 and 7, and its lower member C is shown in Figures 8 and 9. It is advantageous to arrange the unit in a series of interpenetrating elements, as shown, which can easily be assembled together and held firmly in position. The upper member A of Figures 3 and 4 is formed with a central bore 40 having an upper enlargement 41 to receive the downwardly extending end of the sleeve 32 which extends into a bottom enlargement 42, shown as having a rounded outer face 43. The member A is shown as provided with a plurality of bolt holes 44 and also with radial bores 45 adapted to receive outwardly removable heating units 46, the details of which do not of themselves form part of the present invention. Apertures 47 are also provided, as shown, for example, in Figure 1, to receive any suitable thermally responsive elements 48, whereby automatic temperature control may be provided.

The intermediate member, generally indicated as B, and shown in section in Figure 6, has an outer thickened portion 50 having upper and lower conic surfaces 51 and 52 to receive appropriately formed parts of the members A and C when the parts are nested as shown in Figure 1. An inner enlargement 53 has its upper surface formed with an outer rounded portion 54, an intermediate and generally flat portion 55, and a generally conic central projection 56.

It will be observed that the opposed faces of elements A and B contact at 51 but are spaced apart to define between them an outwardly expanding passage in communication with the passage or bore 40. This passage extends entirely around the rounded portion 54, being thus open from edge to edge, with no interruption or interference to the outward passage of the plastic material delivered downwardly through the sleeve 32 and the bore 40. However, the outer portion 50 and the inner portion 53 of the member B are separated by what may be called a trench or depression 57 in the bottom of which are illustrated a plurality of apertures 58 through which, as will later appear, the already plasticized material may flow.

The bottom member C has a conic surface 60 adapted to receive the lower conic surface 52 of the member B. Thus the intermediate parts of the two members are spaced apart, as shown in Figure 1. The lower surface 61 of the member B is spaced somewhat away from the upper surface 62 of the intermediate part of the member C. 63 indicates a tapered passage which, with the conic downward projection 64 of the member B, defines a relatively restricted discharge passage which communicates with a further restricted down passage 63a and a passage portion 65, even more restricted than 63a. The actual outlet passage 65 is controlled by any suitable valve 66 which, for example, may be of the rotary or the sliding type. The lower surface of the member C may be generally plane, as at 70, with a central projection 71 entering an appropriate aperture or seat 72 in the base plate 25.

It will be observed that the members A, B and C are firmly connected by a plurality of screws 75 passing through apertures 44 in the member A, and appropriately aligned apertures 44b and 44c in the other two elements. Thus the pre-plasticizing element as a unit may be assembled or disassembled and secured as a unit to the base plate 25, where it is held in position by the screws 27. The hopper unit is shown as secured to the top plate 26, but I find it preferable also to provide a plurality of screws 29a which actually enter threaded apertures 29b in the upper surface of the element A. It will be noted that each of the elements A, B and C is provided with a plurality of the apertures 45 into which resistance elements or heating units 46 may be inserted. It is preferable to arrange them radially for easy insertion and removal and for relatively uniform heating effect. It will be noted that the apertures 45 of the unit B pass through bridges between adjacent discharge apertures of passages 57.

It is also advantageous to provide heat responsive members 48 in suitable apertures 47. For example, in Figure 1, one such thermocouple or heat responsive unit is illustrated positioned in the member A at a point just above the surface 42. A similar unit is shown in Figure 1 in the member C just below the surface 62. Any suitable indicating and control means, automatic or otherwise, may be employed, for advising the operator as to temperature conditions in the pre-plasticizing unit and for automatically controlling the heating conditions. For example, it is practical to control the current flowing through the leads 100 of the various heating units 46 to maintain the desired temperature and the desired temperature relationship between different parts of the unit.

Whereas valves 8 and 66 have been indicated, one effective to control the flow of plasticized material from the pre-plasticizing unit, and the other to control the flow of plasticized material from the main cylinder 1, the specific operating connection or relationship between the valves is not indicated. It is thought not necessary, since the two valves may be connected by a wide variety of different methods. What is important is that when the valve 66 is open, to permit the flow of pre-plasticized material into the interior of the cylinder 1, the valve 8 is closed. On the other hand, when the piston 9 advances, the valve 66 is closed and the valve 8 is open to permit the flow of the plasticized material through the discharge tip 7 into any suitable mold.

As an example of the foregoing, a fluid motor may be employed to move the piston 9. The fluid motor may be controlled by a valve having a movable member representative of the piston movement. In one position of the valve member the piston 9 is advancing and in another position the piston is retracting. A solenoid may be employed to open and close valve 8 and a solenoid may be employed to open and close valve 66. Each solenoid may be energized by a control circuit established by movement of the fluid motor valve member. When the piston 9 advances, the valve member occupies one position to establish the circuit energizing the solenoid to open valve 8. When the piston 9 retracts, the valve member occupies another position to establish the circuit energizing the solenoid to open valve 66. De-energization of either solenoid results in closing its associated valve.

In pre-plasticizing units of the type herein shown, the interior of the unit may be subjected to exceedingly high pressures. Even though, in the form of Figures 1 and following, large numbers of the locking screws 75 are employed, under some circumstances it is advantageous to substitute, instead, a normally permanent connection between the individual parts. Referring to the structure of Figures 10 and 11, three elements, D, E and F, bear substantially the same relationship to each other as the elements A, B and C of Figure 1. They may be formed to define any suitable form of pre-plasticizing passage, as shown, the individual parts being given the same indicating numerals as in Figures 1 and following. Similarly, the individual elements are provided with apertures 45 and 47 to receive heating units 46 and thermally responsive elements 48, as shown in Figures 1 and following. But the elements D, E and F, instead of being connected by the bolts or screws 75, are actually welded to each other circumferentially, as at 101, 102.

In forming the unit of Figures 10 and 11 it is advantageous initially to raise the individual elements D, E and F to a temperature of the order of 800° F. They may then advantageously be subjected, when assembled and heated, to a pressure of the order of 400 tons. This provides adequate sealing for the high pressures to which the interior of the unit will later be subjected. The unit is then welded circumferentially along the lines 101, 102, and may thereafter be finished to a smooth outer surface.

As shown in Figure 12, it is advantageous to employ four-point welding.

The unit of the type above described, factory-completed, factory-sealed and factory-tested, may then be stored or shipped for use in a wide variety of molding machines.

Whereas a practical and operative device has been described and illustrated, nevertheless many changes may be made in size, shape, number and disposition of parts without departing from the spirit of the invention. It is intended that the description and drawings be taken as in a broad sense illustrative or diagrammatic, rather than as a limitation upon the invention.

The use and operation of the invention are as follows:

The pre-plasticizing unit herein shown is leak-proof and is of sufficient strength for higher ram pressures, where such pressures are necessary. The pre-plasticizing unit includes metal members A, B and C which abut, and which, between themselves, define the necessary expanding passage through which the material undergoing plasticizing flows. As will be clear, for example, from Figure 1, the pre-plasticizing unit, comprising the three elements A, B and C, is firmly secured together by screws 75. It, in turn, is firmly gripped between the plates 25 and 26, being held by the external clamping screws 27. Except for the annular heating element X, all of the heating elements are insertable and removable radially, being received by the generally radial passages 45. The cartridge type heaters thus employed are spaced like the spokes in a wheel. It is unnecessary to tear down the unit to replace burned out heaters, since the external heaters can be replaced while the device is in operation.

The shut-off valve 66 between the plasticizing chamber and the injection cylinder effects an important improvement in efficiency, and actually increases the capacity of the injection cylinder. Without it, the plunger or piston 9 must be pre-set to cover at least one-half of the opening of the orifice or outlet 65, to prevent the forward movement of the plunger 9 from forcing plastic material back into the plasticizing chamber instead of forwardly through the nozzle 7 into the mold. The shut-off valve 66 operates in conjunction with and in timed relation with the nozzle shut-off valve 8. When the valve 8 opens, the valve 66 closes. The valve action is reversed when the injection plunger or piston 9 starts its return stroke.

In the form of Figures 10 and 11 a factory-assembled unit is illustrated, which is pre-sealed and pre-tested, and which may be supplied as a unit for use in a variety of plastic injection devices. For example, only the parts shown in Figure 10 need be supplied. The user normally has no access whatsoever to the interior of the device, and can and should do nothing to break the weld between the adjacent elements D, E and F. The unit thus supplied may then be built into machines of different sizes and capacities, the manufacturer preferably supplying the resistance units, the thermocouples, and the valve, etc.

Where the unit is to be subjected to less than the extremely high pressures, the unit of Figure 1 may be employed, and may be sealed to prevent subsequent tampering. For example, as shown in Figure 1, a seal or weld may be superposed above the head of each of the screws 75, to prevent any tampering by the user, where the unit is to be factory-tested at its point of manufacture, and to be serviced only by the manufacturer.

It will be understood that the unit is formed to receive any suitable upper and lower plates or bases, such as are shown at 2 and 26 in Figure 1. But the details of these plates and bases may be widely varied to suit the particular machine with which the unit is employed. The unit is properly designed to provide a feed passage or receiving passage into which the solid granules are fed. They are then subjected to any desired pressure, as by the piston 34 or its equivalent.

The feed passage 32 of Figure 1, when employed with the unit of Figure 10, directs the material downwardly into the unit against the spreader surface 55 which defines, with the opposed surface 42, a rapidly expanding mensions, and in passage thickness, to the bulk of the material to be fed and to the rate of feed, and to the passage portion which is related, in area, in radial dipressures and temperatures to which the material is to be subjected.

In both forms of the device, zone control is employed, a plurality of thermocouples being indicated as at 48, appropriately spaced to determine and control the temperature at the various zones through which the material undergoing plasticization passes.

I claim:

1. A plasticizing unit adapted to be unitarily inserted and removed from a plasticizing assembly, including a housing formed of three sections, an inner and two outer sections, connected longitudinally and having open areas therein defining a plasticizing passage, the two outer sections each having a generally central passage constituting an inlet and outlet for the plasticizing passage and an inwardly facing dished out portion, the center section including an outer annular member and an inner spreader member separated from the outer member by an annular channel divided into a plurality of arcuate openings by a plurality of islands, the inner spreader member extending at each end longitudinally beyond the annular channel and defining right angle channels with the dished out portions in the outer sections, and three groups of laterally disposed apertures for the reception of heating elements extending into the sections, one group for each section, the apertures in each group lying generally in a common plane generally parallel to the planes of the other groups and generally equally spaced with respect to each other and also with respect to the right angle channels, the point of convergence of each group of apertures lying generally on the center line of the inlet and outlet, each aperture in the group in the inner section passing through an island.

2. The structure of claim 1 in which the sections are welded together.

3. The structure of claim 1 in which the sections are bolted together.

References Cited in the file of this patent

UNITED STATES PATENTS

| | | |
|---|---|---|
| 33,055 | Smith et al. | Aug. 13, 1861 |
| 726,026 | Canda | Apr. 21, 1903 |
| 791,649 | Richards | June 6, 1905 |
| 1,624,501 | Nelson | Apr. 12, 1927 |
| 2,202,140 | Birroughs | May 28, 1940 |
| 2,206,098 | Lester | July 2, 1940 |
| 2,207,426 | Bailey | July 9, 1940 |
| 2,359,840 | Goessling | Oct. 10, 1944 |
| 2,367,144 | Shaver | Jan. 9, 1945 |
| 2,428,315 | Lester | Sept. 30, 1947 |
| 2,465,889 | Lester et al. | Mar. 29, 1949 |
| 2,480,313 | Alden | Aug. 30, 1949 |
| 2,491,343 | Valyi | Dec. 13, 1949 |
| 2,493,805 | Dinzl | Jan. 10, 1950 |
| 2,501,595 | Bohannon | Mar. 21, 1950 |
| 2,582,260 | Kutik | Jan. 15, 1952 |

FOREIGN PATENTS

| | | |
|---|---|---|
| 687,987 | Germany | Feb. 9, 1940 |